US010033951B2

(12) United States Patent
Ikedo et al.

(10) Patent No.: US 10,033,951 B2
(45) Date of Patent: Jul. 24, 2018

(54) IMAGE SENSOR THAT PERFORMS DIFFERENT READOUT OPERATIONS AND IMAGE CAPTURING APPARATUS INCLUDING IMAGE SENSOR

(71) Applicant: CANON KABUSHIKI KAISHA, Tokyo (JP)

(72) Inventors: Hideki Ikedo, Kawasaki (JP); Hisataka Hirose, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 19 days.

(21) Appl. No.: 14/866,023

(22) Filed: Sep. 25, 2015

(65) Prior Publication Data
US 2016/0105623 A1    Apr. 14, 2016

(30) Foreign Application Priority Data
Oct. 8, 2014    (JP) .................................. 2014-207542

(51) Int. Cl.
*H04N 5/378* (2011.01)
*H04N 9/04* (2006.01)
*H04N 5/232* (2006.01)
*H04N 5/347* (2011.01)
*H04N 5/374* (2011.01)

(52) U.S. Cl.
CPC ......... *H04N 5/378* (2013.01); *H04N 5/23212* (2013.01); *H04N 5/347* (2013.01); *H04N 5/3742* (2013.01); *H04N 9/045* (2013.01)

(58) Field of Classification Search
CPC ........ H04N 5/378; H04N 5/376; H04N 5/225; H04N 5/3745; H04N 5/232

USPC ......................................................... 348/320
See application file for complete search history.

(56) References Cited

U.S. PATENT DOCUMENTS

| 9,036,065 | B1* | 5/2015 | Vogelsang | H04N 5/378 348/308 |
| 2014/0063329 | A1* | 3/2014 | Masuyama | H04N 5/23241 348/349 |
| 2014/0192248 | A1* | 7/2014 | Kishi | H04N 5/23212 348/345 |

FOREIGN PATENT DOCUMENTS

| JP | 2001-124984 A | 5/2001 |
| JP | 2013-106194 A | 5/2013 |

* cited by examiner

*Primary Examiner* — Antoinette Spinks
(74) *Attorney, Agent, or Firm* — Cowan, Liebowitz & Letman, P.C.

(57) ABSTRACT

An image capturing apparatus includes: a pixel region in which unit pixels corresponding to colors of color filters having a predetermined color arrangement are arranged in a matrix, each unit pixel having a plurality of photoelectric conversion portions; a first readout unit that performs a first readout operation of reading out a signal of at least one of the plurality of photoelectric conversion portions in each unit pixel, and that includes a merging unit for merging signals of a plurality of pixels corresponding to different colors in the predetermined color arrangement in the first readout operation; and a second readout unit that performs a second readout operation of reading out signals of all of the plurality of photoelectric conversion portions in each unit pixel.

11 Claims, 17 Drawing Sheets

F I G. 10
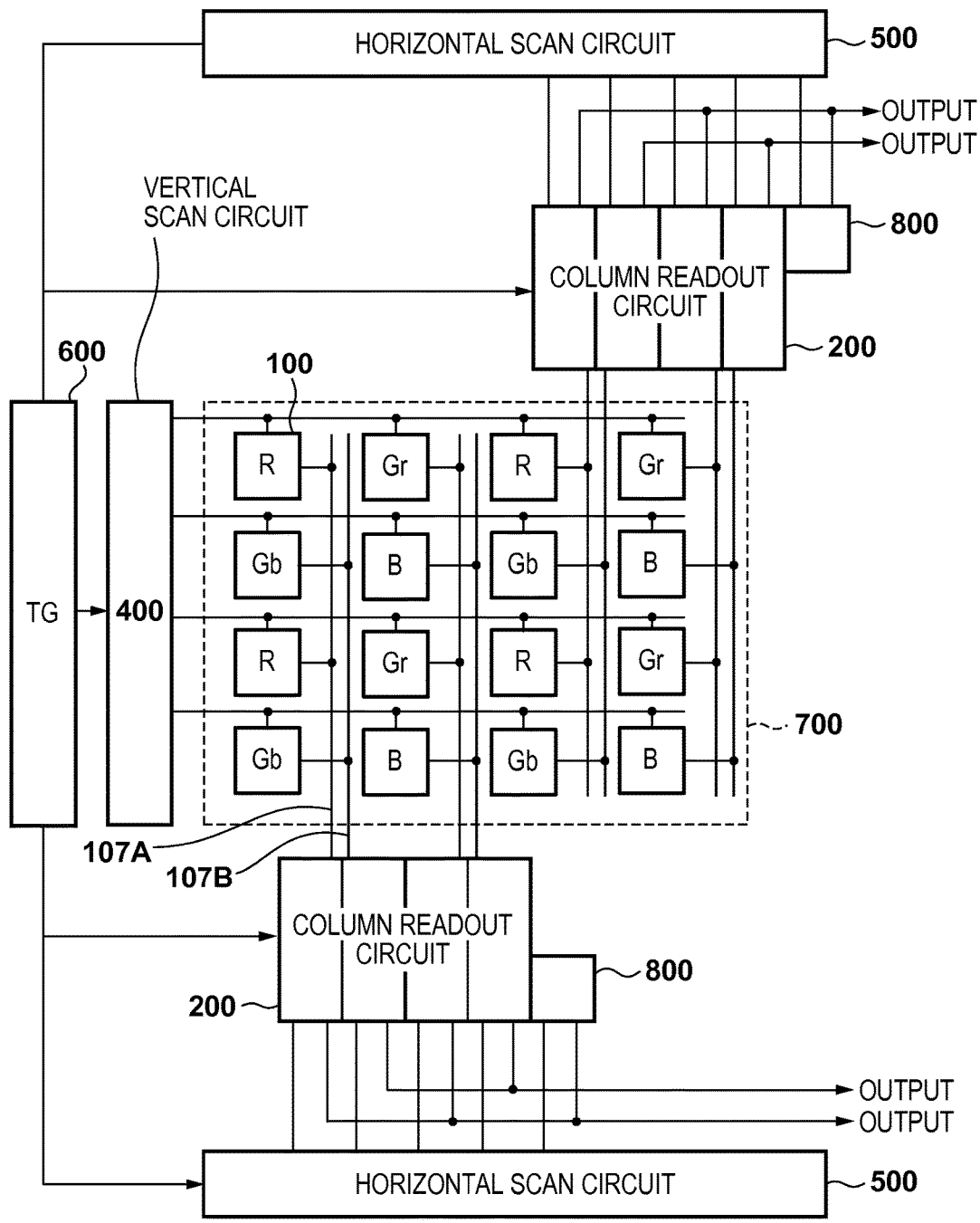

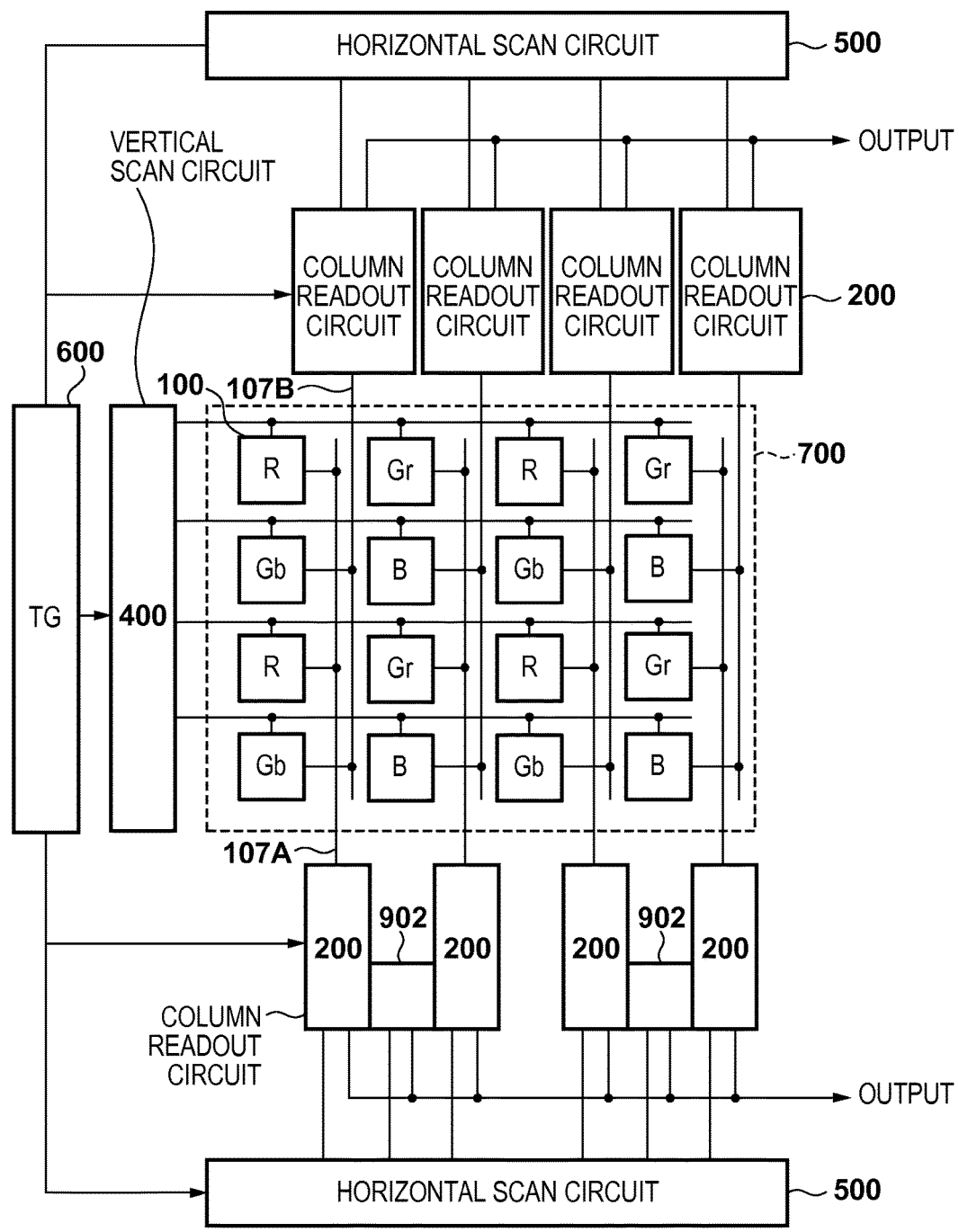
F I G. 17

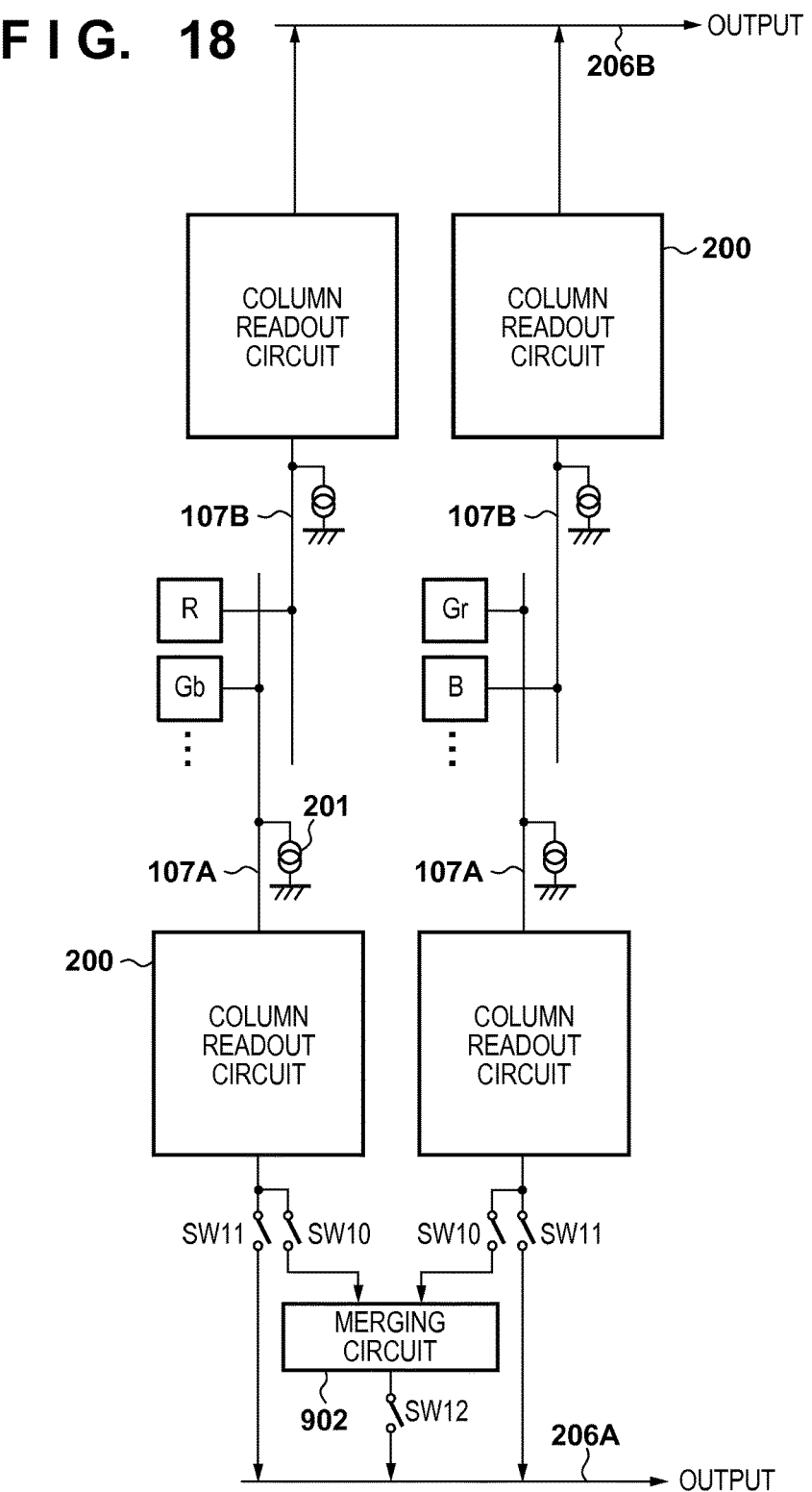
F I G. 18

IMAGE SENSOR THAT PERFORMS DIFFERENT READOUT OPERATIONS AND IMAGE CAPTURING APPARATUS INCLUDING IMAGE SENSOR

BACKGROUND OF THE INVENTION

Field of the Invention

The present invention relates to an image sensor and an image capturing apparatus.

Description of the Related Art

In recent years, solid-state image sensors used in image capturing apparatuses, such as digital still cameras and digital video cameras, are becoming increasingly multifunctional.

Japanese Patent Laid-Open No. 2001-124984 discloses a technique to enable focus detection of a pupil-division type in a solid-state image sensor. According to Japanese Patent Laid-Open No. 2001-124984, one pixel has two photodiodes in the image sensor, and each photodiode is configured to receive light that has passed through different pupil areas of an imaging lens using one microlens. With this configuration, focus detection can be performed on the imaging lens by comparing output signals from the two photodiodes with each other. Furthermore, a signal of a captured image can be obtained by merging the output signals from the two photodiodes.

Meanwhile, Japanese Patent Laid-Open No. 2013-106194 discloses the following technique. In an image sensor in which one pixel has two photodiodes, after a reset level signal and a signal of a first photodiode are read out, a signal of a second photodiode is combined and the combined signal is read out without resetting. The signal of the second photodiode is obtained by subtracting the signal of the first photodiode from the combined signal. According to Japanese Patent Laid-Open No. 2013-106194, as the reset level signal can be used in common to the signals of the first and second photodiodes, the number of readouts of the reset level signal can be reduced by one.

In order to perform focus detection in an image sensor in which one pixel has two photodiodes as in Japanese Patent Laid-Open No. 2001-124984, it is necessary to obtain a signal from each of the two photodiodes. This gives rise to the problem that, compared with a conventional image sensor in which one pixel has one photodiode, the amount of read signals doubles, and a readout time period significantly increases. To address this problem, application of a driving method described in Japanese Patent Laid-Open No. 2013-106194 reduces the number of readouts of a reset level signal by one, thereby reducing a readout time period. However, the effect of such reduction is not considered enough, and there is demand for further reduction in a readout time period.

SUMMARY OF THE INVENTION

The present invention has been made in view of the above problems, and realizes reduction in a signal readout time period in an image capturing apparatus capable of performing focus detection of a pupil-division type without lowering the image quality of a captured image.

According to the first aspect of the present invention, there is provided an image sensor, comprising: a pixel region in which a plurality of unit pixels are arranged in a matrix, each unit pixel having a plurality of photoelectric conversion portions; a readout unit that performs a first readout operation and a second readout operation, the first readout operation reading out a first signal from at least one of the plurality of photoelectric conversion portions in each unit pixel, and the second readout operation reading out second signals from all of the plurality of photoelectric conversion portions in each unit pixel; and a generation unit that generates a luminance signal based on the first signals corresponding to different colors.

According to the second aspect of the present invention, there is provided an image sensor, comprising: a pixel region in which a plurality of unit pixels are arranged in a matrix, each unit pixel having a plurality of photoelectric conversion portions; a readout unit that performs a first readout operation and a second readout operation, the first readout operation reading out a first signal from at least one of the plurality of photoelectric conversion portions in each unit pixel, and the second readout operation reading out second signals from all of the plurality of photoelectric conversion portions in each unit pixel; a generation unit that generates, based on the first signals and the second signals, a third signal equivalent to signals of photoelectric conversion portions that have not been read out in the first readout operation; and an output unit that outputs the first signals, the second signals, and the third signal.

According to the third aspect of the present invention, there is provided an image capturing apparatus, comprising: an image sensor including a pixel region in which a plurality of unit pixels are arranged in a matrix, each unit pixel having a plurality of photoelectric conversion portions, a readout unit that performs a first readout operation and a second readout operation, the first readout operation reading out a first signal from at least one of the plurality of photoelectric conversion portions in each unit pixel, and the second readout operation reading out second signals from all of the plurality of photoelectric conversion portions in each unit pixel, and a generation unit that generates a first luminance signal based on the first signals corresponding to different colors; a signal processing unit that generates a second luminance signal based on the second signals corresponding to different colors, and generates, based on the first luminance signal and the second luminance signal, a third luminance signal equivalent to signals of photoelectric conversion portions that have not been read out in the first readout operation; and a focus detection unit that performs focus detection based on the first luminance signal and the third luminance signal.

According to the fourth aspect of the present invention, there is provided an image capturing apparatus, comprising: an image sensor including a pixel region in which a plurality of unit pixels are arranged in a matrix, each unit pixel having a plurality of photoelectric conversion portions, a readout unit that performs a first readout operation and a second readout operation, the first readout operation reading out a first signal from at least one of the plurality of photoelectric conversion portions in each unit pixel, and the second readout operation reading out second signals from all of the plurality of photoelectric conversion portions in each unit pixel, a generation unit that generates, based on the first signals and the second signals, a third signal equivalent to signals of photoelectric conversion portions that have not been read out in the first readout operation, and an output unit that outputs the first signals, the second signals, and the third signal; a focus detection unit that performs focus detection based on the first signals and the third signal output from the image sensor; and a signal processing unit that generates image data based on the second signals output from the image sensor.

Further features of the present invention will become apparent from the following description of exemplary embodiments with reference to the attached drawings.

BRIEF DESCRIPTION OF THE DRAWINGS

FIG. 10 shows an overall configuration of an image sensor according to a second embodiment.

FIG. 17 shows an overall configuration of an image sensor according to a fourth embodiment.

FIG. 18 shows configurations of column readout circuits and a merging circuit in the image sensor according to the fourth embodiment.

DESCRIPTION OF THE EMBODIMENTS

The following describes embodiments of the present invention in detail with reference to the attached drawings.

First Embodiment

First, a description is given of the principle of focus detection of a pupil-division type performed by an image sensor in embodiments of the present invention.

Figure 1:
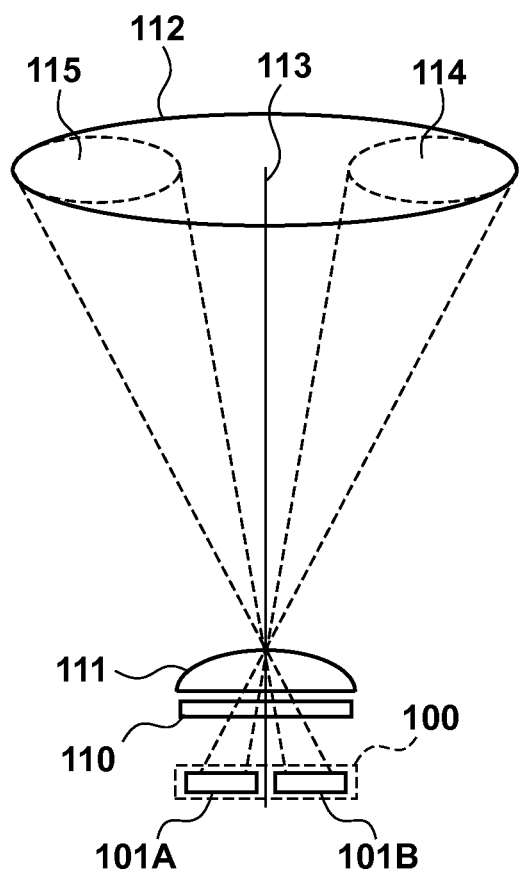
FIG. 1 is a conceptual diagram showing how a beam of light that has exited an exit pupil of an imaging lens is incident on a unit pixel in an image capturing apparatus according to embodiments of the present invention.

FIG. 1 is a conceptual diagram showing how a beam of light that has exited an exit pupil of an imaging lens is incident on a unit pixel. In FIG. 1, a unit pixel 100 has a first photodiode 101A and a second photodiode 101B (a plurality of photoelectric conversion portions). A color filter 110 and a microlens 111 are arranged in front of the unit pixel 100. The imaging lens has an exit pupil 112.

Light that has passed through the exit pupil 112 is incident on the unit pixel 100 with an optical axis 113 at the center. The exit pupil 112 has partial exit pupil areas 114, 115. As shown in FIG. 1, a beam of light that passes through the pupil area 114 is received by the photodiode 101A via the microlens 111, whereas a beam of light that passes through the pupil area 115 is received by the photodiode 101B via the microlens 111. That is to say, the photodiodes 101A and 101B receive light from different areas of the exit pupil of the imaging lens. Therefore, focus detection of a phase difference method can be performed by comparing signals of the photodiodes 101A and 101B with each other.

Herein, a signal obtained from the photodiode 101A and a signal obtained from the photodiode 101B are defined as an A image signal and a B image signal, respectively. A signal obtained by adding the A image signal and the B image signal is defined as an A+B image signal, and this A+B image signal can be used for a captured image. In an image capturing apparatus according to the embodiments, control is performed to read out an A image signal and an A+B image signal from a unit pixel. On the other hand, a B image signal is generated by subtracting an A image signal from an A+B image signal in a later-described signal processing circuit.

Figure 2:
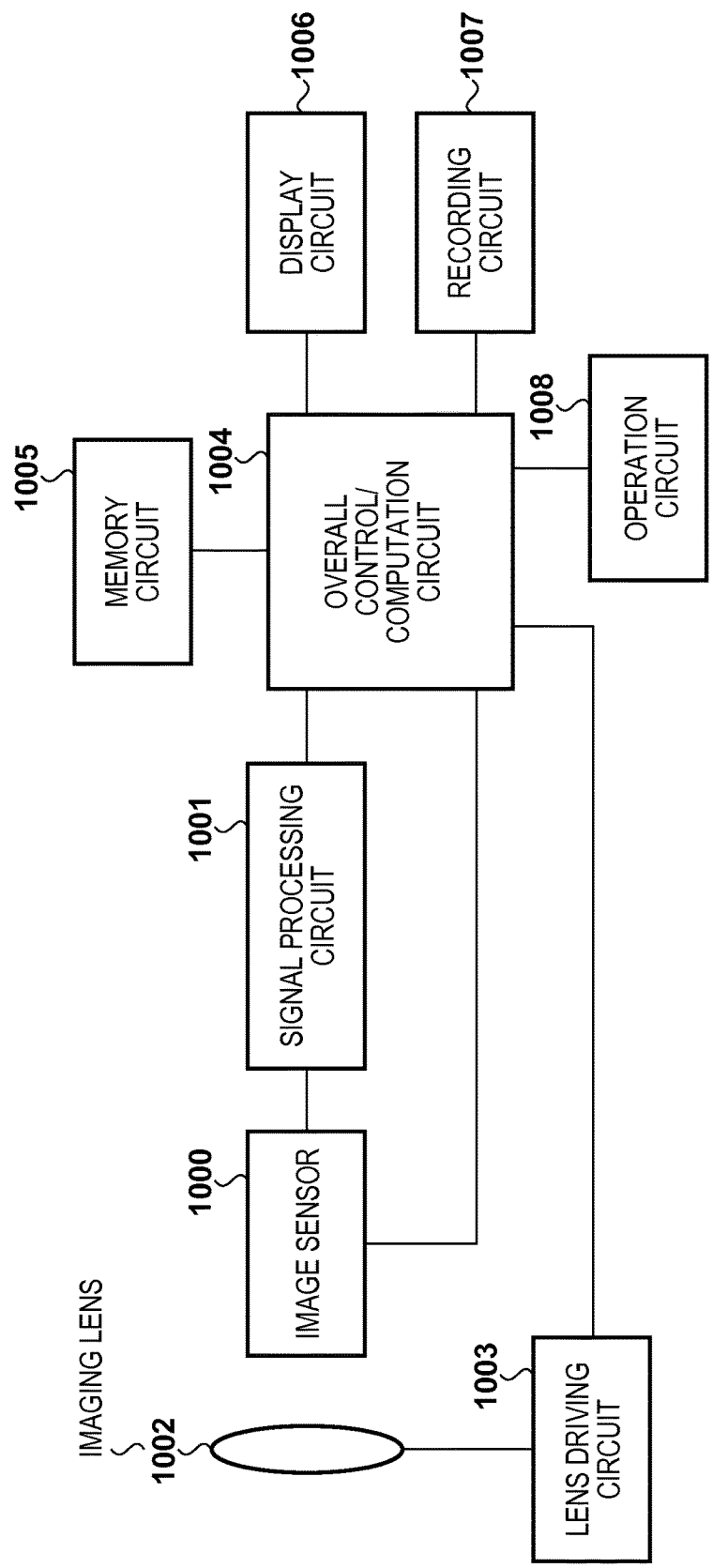
FIG. 2 is an overall block diagram of an image capturing apparatus according to a first embodiment.

FIG. 2 is an overall block diagram of an image capturing apparatus according to the present embodiment. An imaging lens 1002 forms an optical image of a subject on an image sensor 1000, and a lens driving circuit 1003 performs zoom control, focus control, diaphragm control, and the like. The image sensor 1000 imports the subject image formed by the imaging lens 1002 as an image signal, and includes unit pixels that are arranged in an array. A signal processing circuit 1001 generates image data by applying various types of image correction processing to an image signal (A+B image signal) output from the image sensor 1000. The signal processing circuit 1001 also generates a B image signal from an A image signal and an A+B image signal obtained by the image sensor 1000. An overall control/computation circuit 1004 carries out various types of computation, controls the entire image capturing apparatus, and performs a focus detection operation using an A image signal and a B image signal. A memory circuit 1005 temporarily stores image data, and a display circuit 1006 displays various types of information and captured images. A recording circuit 1007 is an attachable/removable recording circuit, such as a semiconductor memory, for recording or reading out image data. An operation circuit 1008 electrically accepts operations on an operation member of a digital camera.

Figure 3:
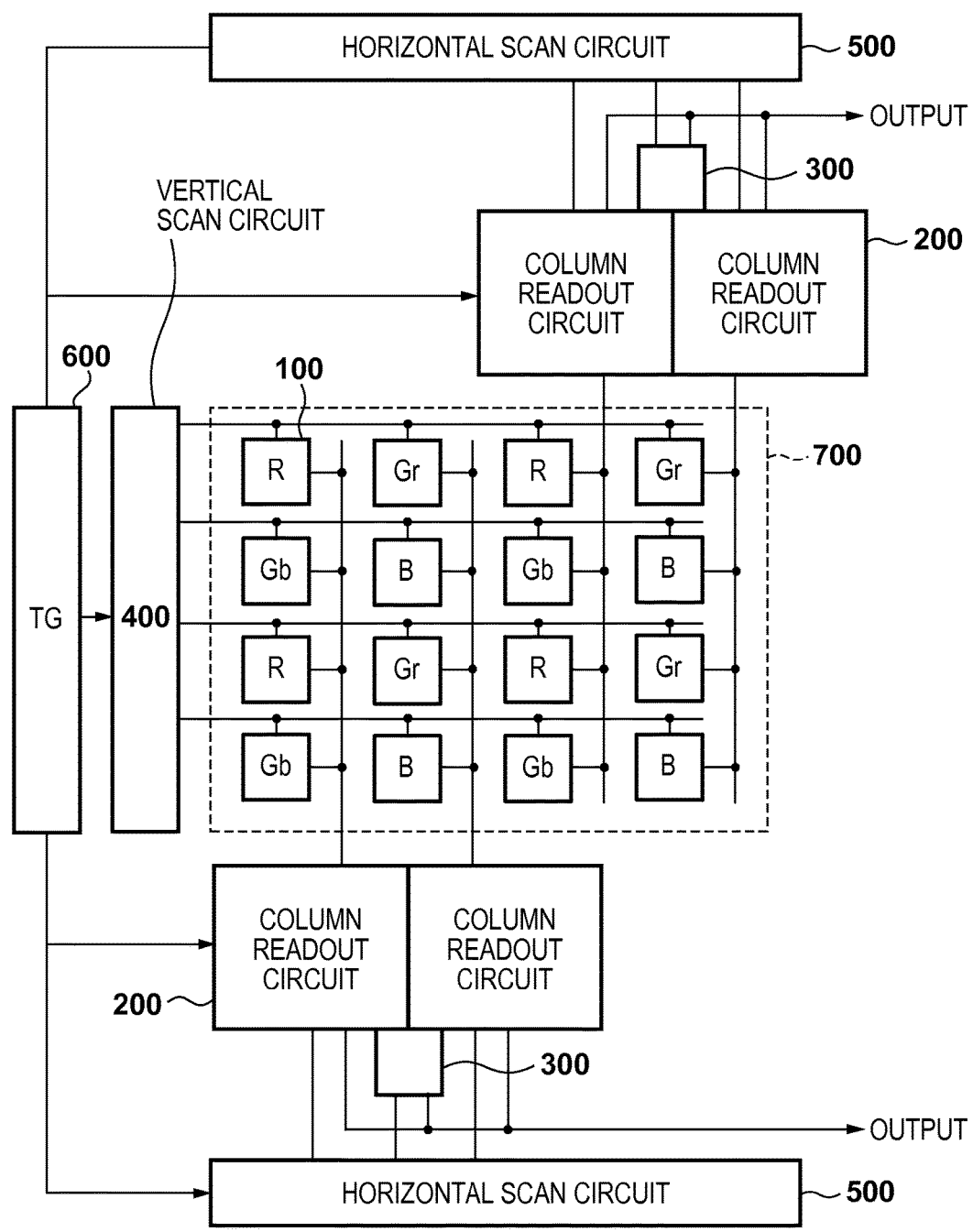
FIG. 3 shows an overall configuration of an image sensor according to the first embodiment.

A configuration of the image sensor 1000 will now be described with reference to FIGS. 3 to 5. FIG. 3 shows an overall configuration of the image sensor 1000. The image sensor 1000 is composed of a pixel region 700, column readout circuits 200, Bayer merging circuits 300, a vertical scan circuit 400, horizontal scan circuits 500, and a timing generation circuit (TG) 600.

In the pixel region 700, unit pixels 100 are arranged in a matrix. Although a four-by-four pixel arrangement is illustrated for ease of explanation, a larger number of pixels are arranged in practice. It should be noted that a pixel 100 at the upper left corner of the pixel region 700 is defined as a pixel in the first row and the first column throughout the present specification, unless specifically stated otherwise. The unit pixels 100 are provided with color filters; pixels that are provided with red color filters and capture images of red light are referred to as R pixels, and pixels that are provided with green color filters and capture images of green light are referred to as Gr pixels and Gb pixels. Pixels that are provided with blue color filters and capture images of blue light are referred to as B pixels. Pixels corresponding to the foregoing color filters in three colors are arranged in accordance with a Bayer arrangement.

The vertical scan circuit 400 selects pixels in the pixel region 700 on a row-by-row basis, and transmits a driving signal to the pixels in the selected row. The column readout circuits 200 are in one-to-one correspondence with the pixel columns, and based on signals from the horizontal scan circuits 500, output signals that have been read out from the pixels to the outside of the image sensor. In the example of the image sensor shown in FIG. 3, the column readout circuits for the first and second columns are arranged below the pixel region, whereas the column readout circuits for the third and fourth columns are arranged above the pixel region. That is to say, column readout circuits arranged above the pixel region for a pair of consecutive columns alternate with column readout circuits arranged below the pixel region for the next pair of consecutive columns. One Bayer merging circuit 300 is provided for every two columns. The Bayer merging circuits 300 receive, as input, A image signals of R, Gr, Gb, and B pixels via the column readout circuits, and generate merged signals thereof.

Two horizontal scan circuits 500 are respectively arranged above and below the pixel region 700; the lower horizontal scan circuit is connected to the first and second columns, whereas the upper horizontal scan circuit is connected to the third and fourth columns. With this configuration, for example, pixel signals of the first and third columns can be simultaneously output to the outside of the image sensor by the two horizontal scan circuits selecting the column readout circuits provided for the first and third columns, respectively. The timing generation circuit (TG) 600 transmits signals for controlling the column readout circuits, the vertical scan circuit, and the horizontal scan circuits.

Figure 4:
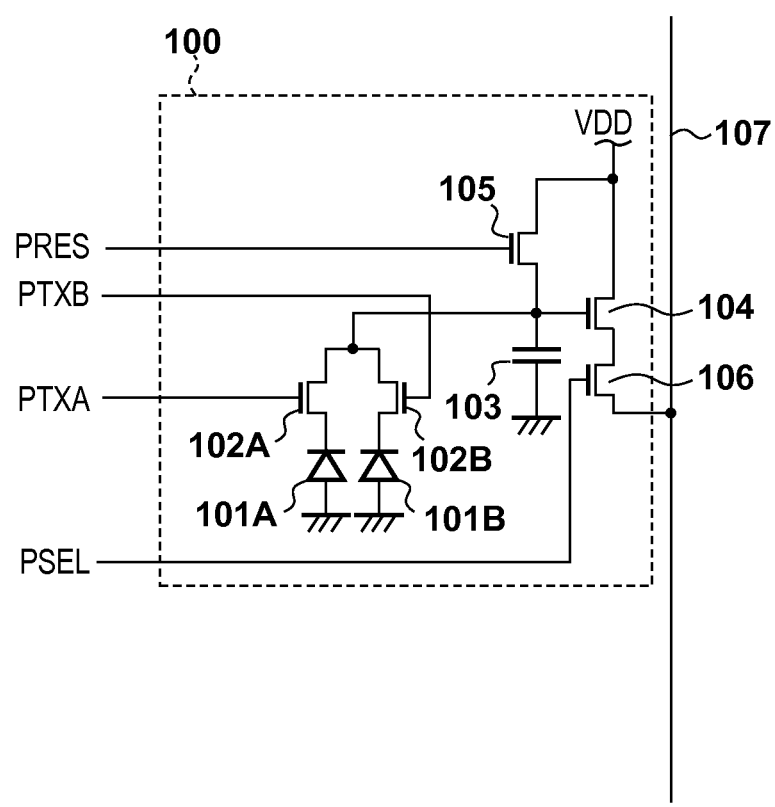
FIG. 4 is a circuit diagram of a unit pixel in the image sensor according to the first embodiment.

FIG. 4 is a circuit diagram showing a unit pixel in the image sensor according to the present embodiment. A unit pixel 100 includes a first photodiode 101A, a second photodiode 101B, a first transfer switch 102A, and a second transfer switch 102B. It also includes a floating diffusion unit 103, an amplifier unit 104, a reset switch 105, and a selection switch 106.

The photodiodes 101A, 101B function as photoelectric conversion portions that receive light that has passed through the same microlens, and generate signal charges corresponding to the amounts of received light. The transfer switches 102A, 102B respectively transfer the charges generated in the photodiodes 101A, 101B to the common floating diffusion unit 103. The transfer switches 102A, 102B are respectively controlled by transfer pulse signals PTXA, PTXB. The floating diffusion unit 103 functions as a charge-voltage conversion unit that temporarily stores the charges transferred from the photodiodes 101A, 101B, and converts the stored charges into voltage signals. The amplifier unit 104 is a source follower MOS transistor; it amplifies the voltage signals based on the charges stored in the floating diffusion unit 103, and outputs the amplified voltage signals as pixel signals. The reset switch 105 is controlled by a reset pulse signal PRES, and resets the potential of the floating diffusion unit 103 to a reference potential VDD. The selection switch 106 is controlled by a vertical selection pulse signal PSEL, and outputs the pixel signals amplified by the amplifier unit 104 to a vertical output line 107.

Figure 5:
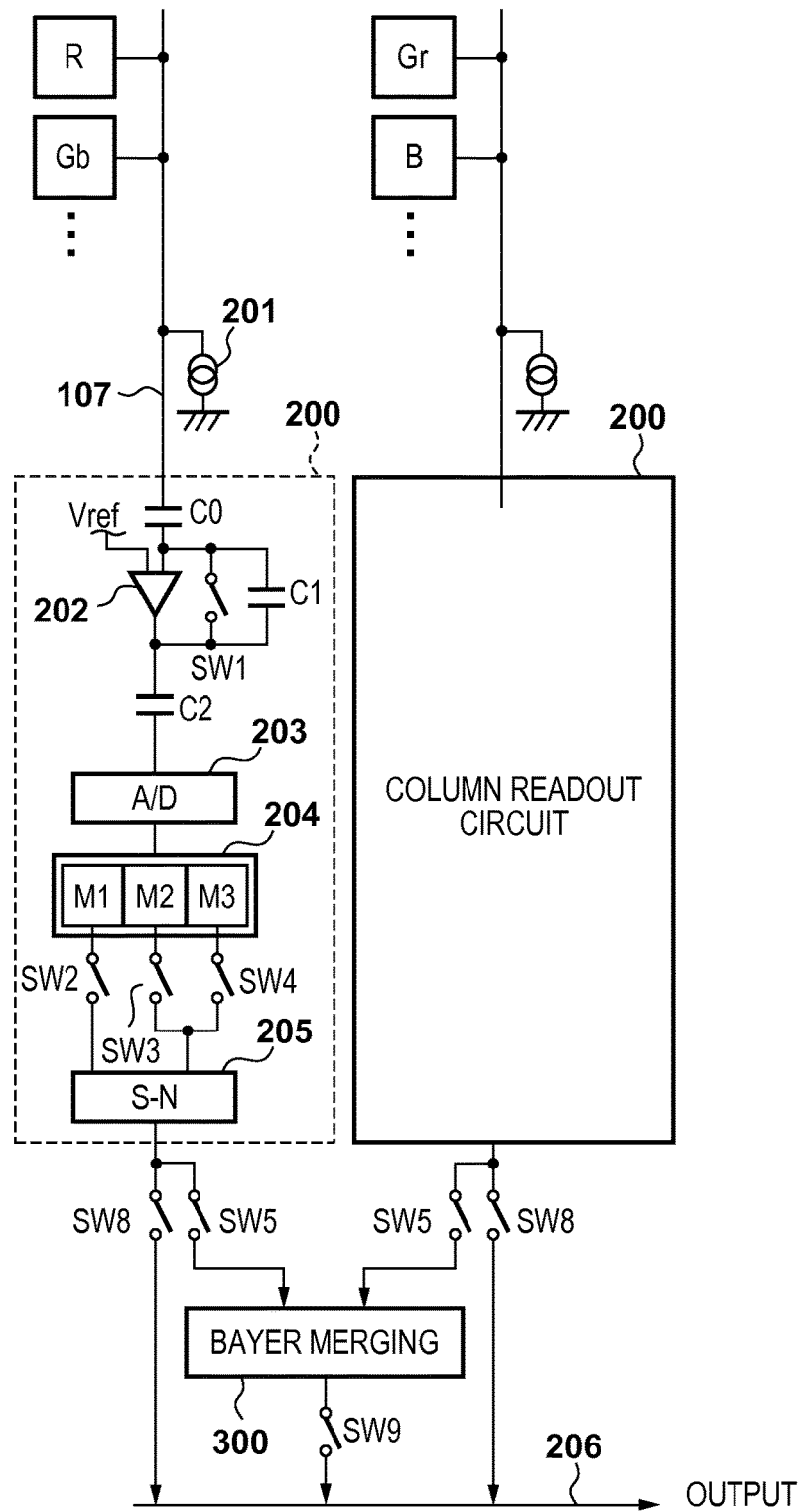
FIG. 5 is a circuit diagram of column readout circuits in the image sensor according to the first embodiment.

FIG. 5 shows a configuration of column readout circuits 200 for two columns that are read out from the pixel region in the same direction. Referring to FIG. 5, a constant current source 201 is connected to a vertical output line 107. A clamp capacitor C0 and a feedback capacitor C1 are also connected to the vertical output line 107. An operational amplifier 202 amplifies and outputs signals that are output from the unit pixels via the vertical output line 107 and the clamp capacitor C0. In the operational amplifier 202, an inverse gain corresponding to a capacity ratio between the feedback capacitor C1 and the clamp capacitor C0 is generated. A switch SW1 is provided to short-circuit an input/output terminal of the operational amplifier 202, and is used to reset the operational amplifier. Signals output from the operational amplifier 202 are input to an A/D conversion circuit 203 via a clamp capacitor C2.

The A/D conversion circuit 203 converts signals that have been input from the operational amplifier 202 via the clamp capacitor C2 into digital signals. The A/D conversion circuit 203 is composed of, for example, a comparison circuit and a counter circuit, which are not shown. The comparison circuit compares a ramp signal whose voltage value changes depending on time with a signal input via the clamp capacitor C2, and transmits a signal to the counter circuit at a timing when the magnitude relationship between the signals is inversed. Upon accepting the signal from the comparison circuit, the counter circuit stores a counted value. This counted value is imported and stored into a memory 204 as a digital signal.

The memory 204 has three memory units for storing digital signals. Memories M1, M2, and M3 respectively store an N signal, an A image signal, and an A+B image signal, which will be described later. An S-N circuit 205 receives, as input, a digital signal stored in the memory M1 of the memory circuit, as well as a digital signal stored in the memory M2 or M3 of the memory circuit, via switches SW2, SW3, SW4. The S-N circuit 205 subtracts the input digital signal in M1 from the input digital signal in M2 or M3, and stores a signal obtained as a result of subtraction.

One Bayer merging circuit 300 is provided for every two columns, and each Bayer merging circuit receives, as input, digital signals stored in the S-N circuits of two column readout circuits via switches SW5. The Bayer merging circuits also receive, as input, A image signals of R, Gr, Gb, and B pixels, and generate merged signals thereof. Digital signals stored in the S-N circuits 205 and digital signals stored in the Bayer merging circuits 300 are output to a digital signal line 206 via switches SW8 and SW9, respectively.

Figure 6:
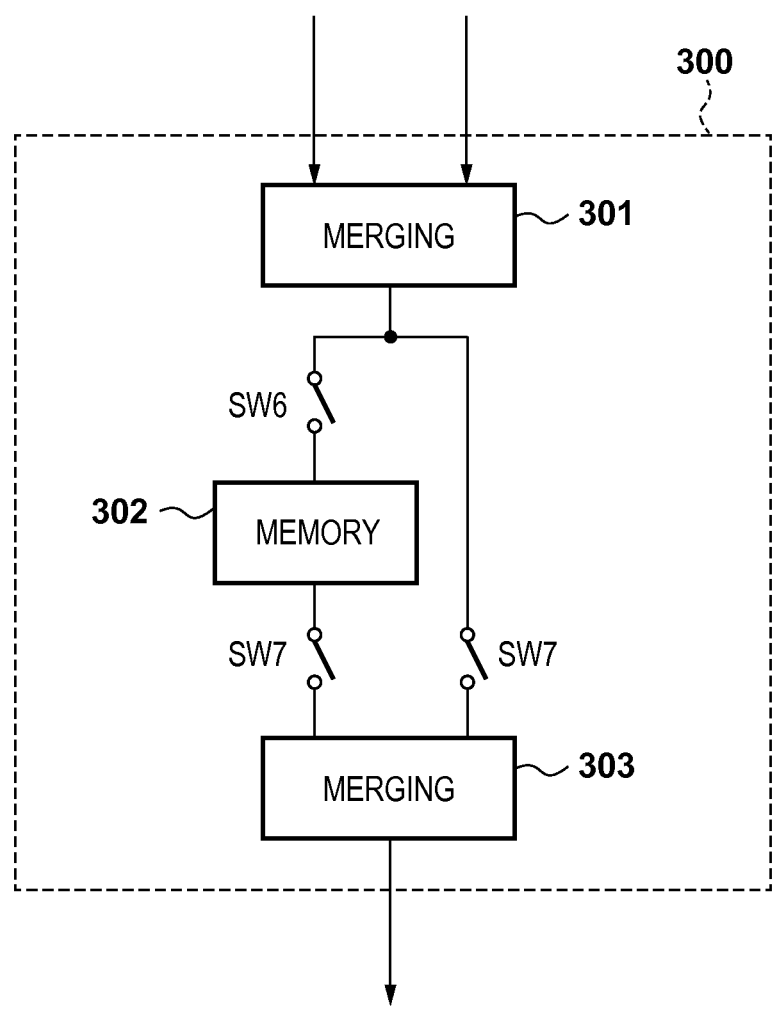
FIG. 6 shows a configuration of a Bayer merging circuit in the image sensor according to the first embodiment.

FIG. 6 shows a detailed configuration of a Bayer merging circuit 300. A Bayer merging circuit 300 includes two merging circuits 301, 303 and a memory 302. The merging circuit 301 receives, as input, digital signals stored in the S-N circuits for two columns via the switches SW5, and generates and stores a merged signal thereof. The memory 302 imports and temporarily stores the merged signal stored in the merging circuit 301 via a switch SW6. The merging circuit 303 receives, as input, digital signals from the memory 302 and the merging circuit 301 via switches SW7, and generates and stores a merged signal thereof.

Figure 7:
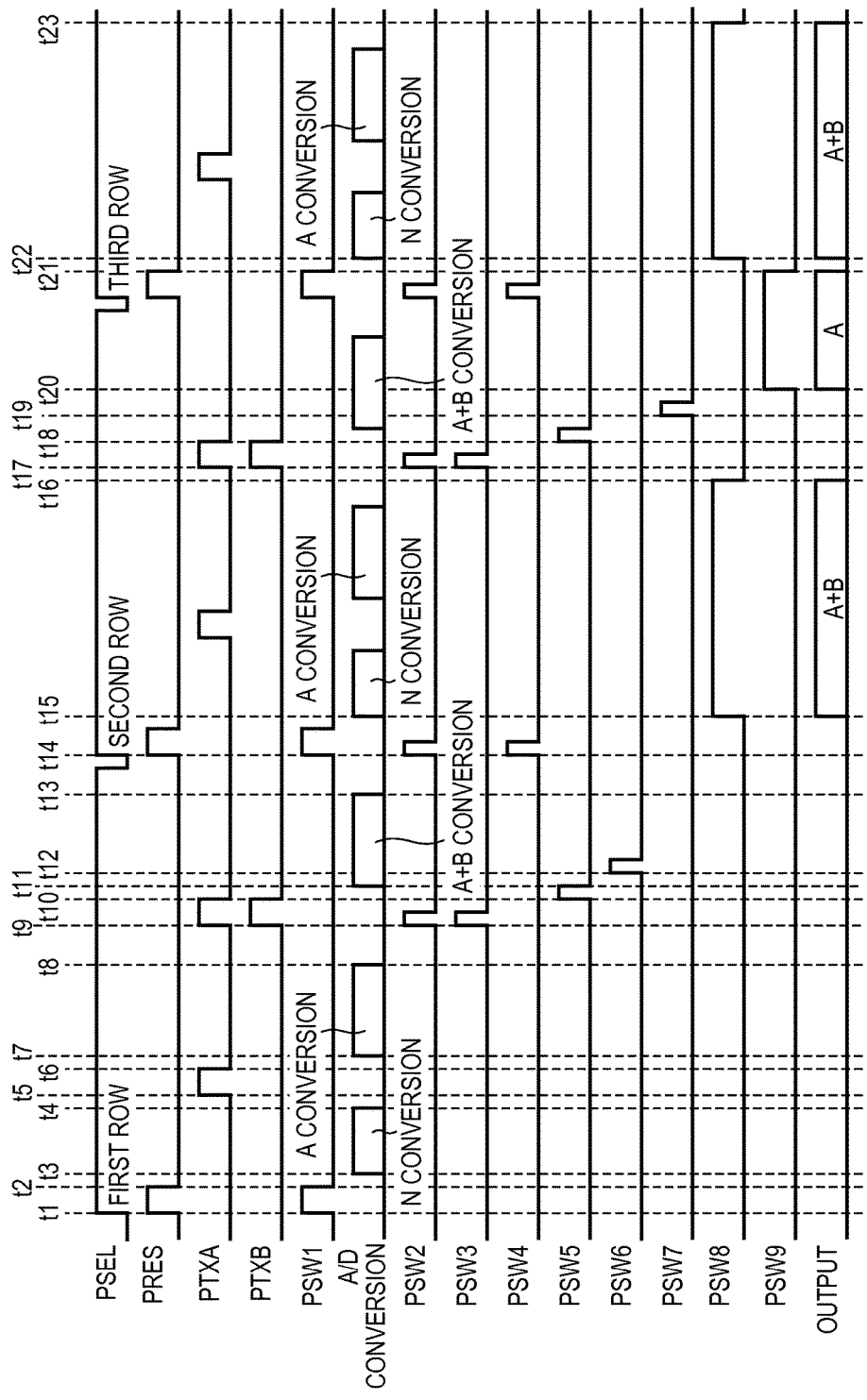
FIG. 7 is a driving timing chart according to the first embodiment.

FIG. 7 is a driving timing chart for the image capturing apparatus according to the present embodiment. It should be noted that, in FIG. 7, control signals PSW1 to PSW9 are signals for controlling the switches SW1 to SW9 shown in FIGS. 5 and 6, respectively, and the switches are on when the corresponding control signals are at level H.

At time t1, the vertical selection pulse signal PSEL for the first row is set to H, the selection switches 106 of pixels in the first row are turned on, and the pixels in the selected row are connected to the vertical output lines 107. At this time, the reset pulse signal PRES is set to H, the reset switches 105 of the pixels are on, and the floating diffusion units 103 of the pixels are at a reset level. Therefore, pixel signals corresponding to the reset level of the floating diffusion units 103 are output to the vertical output lines 107. Furthermore, as the control signal PSW1 is set to H, the switches SW1 are on, the input/output terminals of the operational amplifiers 202 are short-circuited, and the operational amplifiers are in a reset state.

At time t2, the reset pulse signal PRES and the control signal PSW1 are set to L, and thus the reset switches 105 and the switches SW1 are turned off. Potentials at the time of cancellation of reset of the floating diffusion units 103 and the operational amplifiers 202 are stored in the clamp capacitors C0 and C1. Pixel signals that are output to the vertical output lines 107 at time t2 are reset level signals, and they are referred to as N signals. The operational amplifiers 202 amplify the N signals supplied thereto via the clamp capacitors C0, and output the amplified N signals to the clamp capacitors C2.

From time t3 to time t4, the N signals that have been output from the operational amplifiers 202 via the clamp capacitors C2 are converted into digital signals by the A/D conversion circuits 203. The converted digital signals are stored into M1 of the memories 204. This operation of converting the N signals into the digital signals from time t3 to time t4 is referred to as N conversion.

Thereafter, at time t5, the transfer pulse signal PTXA is set to H. Consequently, the transfer switches 102A of the pixels are turned on, and the signal charges generated through photoelectric conversion in the photodiodes 101A are transferred to the floating diffusion units 103. Signals corresponding to the amounts of charges generated in the photodiodes 101A, i.e., A image signals, are output to the vertical output lines 107. At time t6, the transfer pulse signal PTXA is set to L, and thus the transfer switches 102A are turned off. At this time, the A image signals are stored in the clamp capacitors C0, and the operational amplifiers 202 amplify the A image signals stored in the clamp capacitors C0 and output the amplified A image signals to the A/D conversion circuits 203 via the clamp capacitors C2. From time t7 to time t8, the A image signals that have been output from the operational amplifiers 202 via the clamp capacitors C2 are converted into digital signals by the A/D conversion circuits. The converted digital signals are stored into M2 of the memories 204. This operation of converting the A image signals into the digital signals from time t7 to time t8 is referred to as A conversion.

Thereafter, at time t9, the transfer pulse signals PTXA and PTXB are simultaneously set to H. Consequently, the transfer switches 102A and 102B of the pixels are simultaneously turned on, and the signal charges in the photodiodes 101B are transferred to the floating diffusion units 103 in addition to the signal charges in the photodiodes 101A, which have already been transferred. Signals corresponding to sums of signal charges in both photodiodes 101A and 101B, i.e., A+B image signals, are output to the vertical output lines 107. It should be noted that, at time t9, control may be performed to set only the transfer pulse signal PTXB to H. At time t10, the transfer pulse signals PTXA and PTXB are set to L, and thus the transfer switches 102A and 102B are turned off. At this time, the A+B image signals are stored in the clamp capacitors C0, and the operational amplifiers 202 amplify the A+B image signals stored in the clamp capacitors C0 and output the amplified A+B image signals to the A/D conversion circuits via the clamp capacitors C2. From time t11 to time t13, the A+B image signals that have been output from the operational amplifiers 202 via the clamp capacitors C2 are converted into digital signals by the A/D conversion circuits 203. The converted digital signals are stored into M3 of the memories 204. This operation of converting the A+B image signals into the digital signals from time t11 to time t13 is referred to as A+B conversion.

Furthermore, at time t9, the control signals PSW2 and PSW3 are set to H, and thus the switches SW2 and SW3 are turned on. Consequently, the N signals and the A image signals that are respectively stored in M1 and M2 of the memories 204 are input to the S-N circuits 205. The S-N circuits 205 subtract the N signals from the A image signals and store the post-subtraction A image signals. This processing is referred to as S-N processing. Through the S-N processing, fixed pattern noise and offset components can be removed from pixel signals. At time t10, the control signal PSW5 is set to H, and thus the switches SW5 are turned on. Consequently, each Bayer merging circuit 300 receives, as input, the A image signals that have undergone the S-N processing, which are stored in the S-N circuits 205 of two column readout circuits. In the Bayer merging circuit 300 shown in FIG. 6, the input A image signals of two columns are input to the merging circuit 301, and a merged signal thereof is generated and stored. In the example of FIG. 5, the signals merged here are the A image signals of an R pixel and a Gr pixel in the first row. This merged signal is referred to as an A image signal of R+Gr pixels. Thereafter, at time t12, the control signal PSW6 is set to H, and thus the switch SW6 is turned on. Consequently, the memory 302 imports and stores the A image signal of R+Gr pixels stored in the merging circuit 301. The stored state of this A image signal of R+Gr pixels will be maintained until the A image signals of the next row are input to the Bayer merging circuit.

At time t14, the control signals PSW2 and PSW4 are set to H, and thus the switches SW2 and SW4 are turned on. Consequently, the N signals and the A+B image signals that are respectively stored in M1 and M3 of the memories 204 are input to the S-N circuits 205. Similarly to the case of the A image signals, the S-N circuits 205 subtract the N signals from the A+B image signals and store the post-subtraction A+B image signals. It is sufficient to complete the above-described S-N processing for A image signals and A+B image signals until the start of N conversion for the second row.

At time t14, the vertical selection pulse signal PSEL for the second row is set to H, the selection switches 106 of pixels in the second row are turned on, and the pixels in the selected row are connected to the vertical output lines 107. The operations of reading out signals from pixels in the second row onward and applying A/D conversion to the read signals are similar to the operations for the first row, and therefore a detailed description thereof is omitted.

Between time t15 and time t16, the control signal PSW6 is set to H, the switches SW8 are turned on, and the S-N circuits 205 are connected to the digital signal line 206. Then, the horizontal scan circuits perform horizontal scanning; as a result, the A+B image signals of pixels in the first row, which are stored in the S-N circuits for different columns, are sequentially output to the outside of the image sensor via the digital signal line 206. This horizontal scanning of A+B image signals is performed during N conversion and A conversion of pixel signals in the second row.

At time t17 that follows completion of A conversion of pixels in the second row, the control signals PSW2 and PSW3 are set to H, and thus the switches SW2 and SW3 are turned on. Consequently, the N signals and the A image signals of the second row that are respectively stored in M1 and M2 of the memories 204 are input to the S-N circuits 205, and the S-N processing is applied to the A image signals.

At time t18, the control signal PSW5 is set to H, and thus the switches SW5 are turned on. Consequently, each Bayer merging circuit 300 receives, as input, the A image signals that have undergone the S-N processing, which are stored in the S-N circuits 205 of two column readout circuits. In the Bayer merging circuit 300 shown in FIG. 6, the input A image signals of two columns are input to the merging circuit 301, and a merged signal thereof is generated and stored. In the example of FIG. 5, the signals merged here are the A image signals of a Gb pixel and a B pixel in the second row. This merged signal is referred to as an A image signal of Gb+B pixels. At time t19, the control signal PSW7 is set to H, and thus the switches SW7 of the Bayer merging circuit 300 are turned on. Consequently, the merged signal of the first row stored in the memory 302 (the A image signal of R+Gr pixels) and the merged signal stored in the merging circuit 301 (the A image signal of Gb+B pixels) are input to the merging circuit 303, and a merged signal thereof is generated and stored. This merged signal represents a luminance signal, and a value thereof is obtained by merging the A image signals of R, Gr, Gb, and B pixels. These merged A image signals are hereinafter referred to as A image signals merged into a Y signal.

Figure 8:
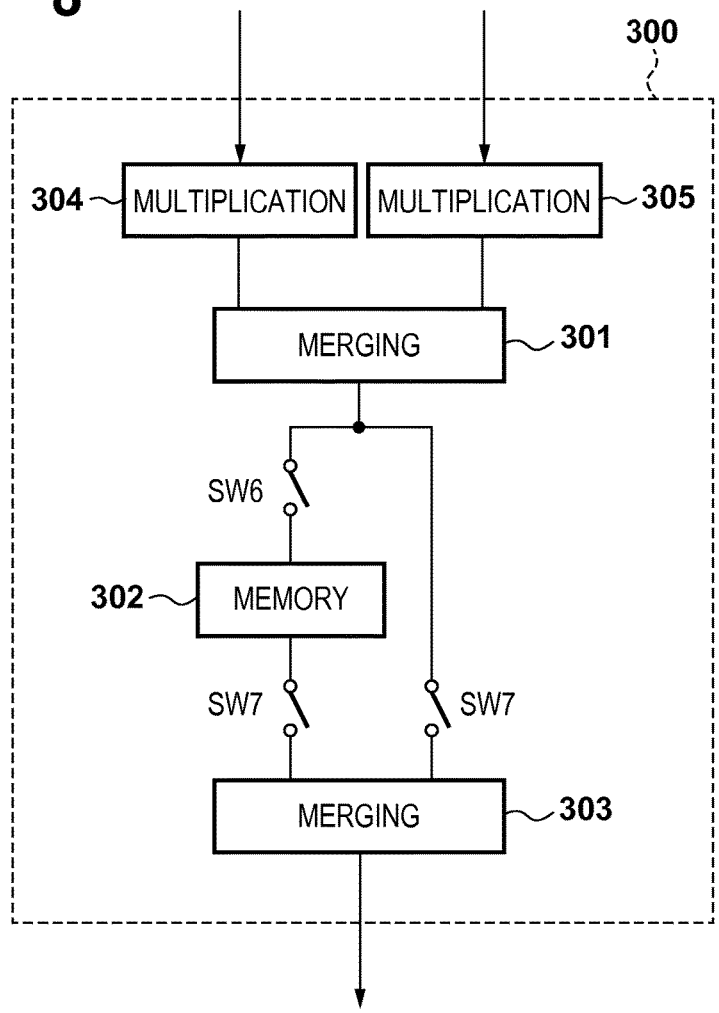
FIG. 8 shows a configuration of a Bayer merging circuit according to a modification example of the first embodiment.

In the above-described present embodiment, a Y signal is generated by simply merging R, Gr, Gb, and B pixel signals; alternatively, as in a modification example of a Bayer merging circuit shown in FIG. 8, a Y signal may be generated by merging A image signals of different pixels after multiplying each of the A image signals by a predetermined coefficient. Referring to FIG. 8, multiplication circuits 304, 305 multiply input digital signals by a predetermined coefficient. A value of a coefficient by which an A image signal of a pixel is multiplied varies with each color. In this case, it is sufficient to perform multiplication using a similar coefficient also in Bayer merging processing that is applied to A+B image signals in a Bayer merging unit 1009 of the signal processing circuit, which will be described later with reference to FIG. 9.

Thereafter, between time t20 and time t21 of FIG. 7, the control signal PSW9 is set to H, the switches SW9 are turned on, and the Bayer merging circuits 300 are connected to the digital signal line 206. Then, the horizontal scan circuits perform horizontal scanning; as a result, the A image signals that have been merged into the Y signals, which are stored in the Bayer merging circuits, are sequentially output to the outside of the image sensor via the digital signal line. At this time, the number of columns for which horizontal scanning is performed is half the number of columns corresponding to A+B image signals. This horizontal scanning for the A image signals is performed in parallel with A+B conversion. Thereafter, from time t22 to time t23, A+B image signals of the second row are sequentially output to the outside of the image sensor via the digital signal line 206.

The above-described readout operation is repeated until the last row of the pixel region. Through this readout operation, A+B image signals are output as Bayer signals of R, Gr, Gb, and B pixels from the digital signal line on a row-by-row basis. On the other hand, A image signals that have been merged into Y signals through Bayer merging are output each time A+B image signals of two rows are output.

In FIG. 7, horizontal scanning for the A image signals is performed in parallel with A+B conversion. Incidentally, due to an increasing number of pixels in recent image sensors, the number of output pixels is increasing. Although a time period required for A+B conversion does not depend on the number of output pixels, a time period of horizontal scanning depends on the number of output horizontal pixels and on the frequency of horizontal scanning; for this reason, an increasing number of pixels in an image sensor means a longer time period of horizontal scanning. In view of this, a driving method according to the present embodiment can reduce a time period of horizontal scanning for A images by half because the horizontal scanning is performed after Bayer merging of the A image signals; as a result, a time period required to read out signals of the image sensor can be reduced. Furthermore, the number of output pixels of the A image signals can be reduced to one-fourth. On the other hand, as the A+B image signals are color signals that are read out without Bayer merging, there is no reduction in resolution caused by a reduction in the number of pixels in a captured image. That is to say, a readout time period can be reduced without lowering the image quality of a captured image.

Moreover, the A image signals used for focus detection are merged into luminance signals through Bayer merging; therefore, the accuracy of focus detection can be improved in the case of a scene with a low subject luminance. In addition, by using the luminance signals, stable focus detection can be performed regardless of the color of the subject.

It should be noted that the S-N processing of the S-N circuits 205 shown in FIG. 5 may be executed by the signal processing circuit outside the image sensor. In this case, it is sufficient to perform control to output a set of A image signals and N signals and a set of A+B image signals and N signals from the digital signal line 206, and it is sufficient for the Bayer merging circuits to perform Bayer merging of the N signals that are output at the same time as the A image signals, similarly to the A image signals. Furthermore, A/D conversion processing executed by the A/D conversion circuits 203 may also be executed by the signal processing circuit outside the image sensor.

Figure 9:
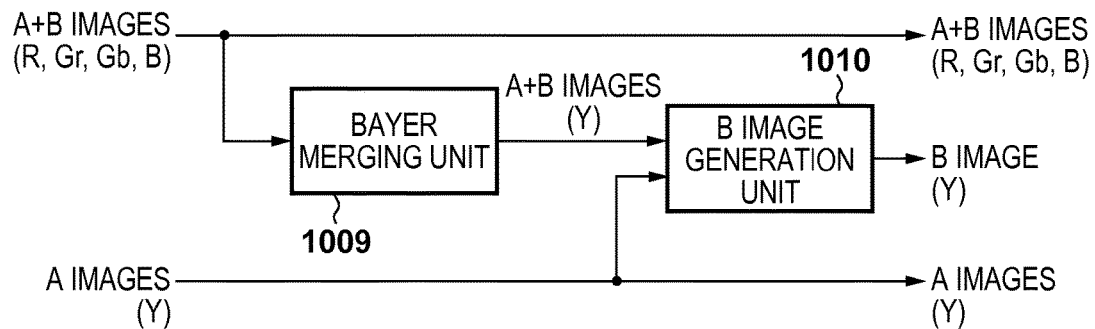
FIG. 9 illustrates B image generation processing according to the first embodiment.

The A image signals and the A+B image signals output from the image sensor 1000 are input to the signal processing circuit 1001 shown in FIG. 2. FIG. 9 illustrates B image generation processing executed by the signal processing circuit 1001. A+B image signals output from the image sensor as Bayer signals are not only input to the Bayer merging unit 1009, but also transmitted to the overall control/computation circuit as-is, i.e., as the Bayer signals and used as image signals. The Bayer merging unit 1009 merges the A+B image signals into a Y signal through Bayer merging. A B image generation unit 1010 receives, as input, the A+B image signals that have been merged into the Y signal by the Bayer merging unit 1009, as well as A image signals that have been merged into a Y signal and output from the image sensor. Then, a B image signal is generated by subtracting the A image signals from the A+B image signals. The A image signals that have been merged into the Y signal, as well as the B image signal, are transmitted to the overall control/computation circuit and used for focus detection. It should be noted that the B image generation processing shown in FIG. 9 may be executed by a signal processing circuit provided inside the image sensor 1000.

Second Embodiment

With the image sensor described in the first embodiment, in order to merge A image signals into Y signals, it is necessary to store A image signals of R+Gr pixels in the memories 302 of the Bayer merging circuits 300 from when pixel signals of a row corresponding to R and Gr are read out until when signals of Gb and B pixels in the next row are read out. The present embodiment describes a method of merging A image signals into Y signals by simultaneously reading out pixel signals of two rows, thereby simultaneously reading out signals of R, Gr, Gb, and B pixels.

FIG. 10 shows an overall configuration of an image sensor 1000 according to a second embodiment. FIG. 10 corresponds to FIG. 3 of the first embodiment; constituents that have the same functions as their counterparts in the first embodiment are given the same reference numerals thereas, and a redundant description thereof is omitted. As shown in FIG. 10, every pixel column is provided with two vertical output lines 107A and 107B, and in a pixel region, pixels in the first row are connected to the vertical output lines 107A, and pixels in the second row are connected to the vertical output lines 107B. The vertical output lines 107A, 107B are connected to different column readout circuits 200. That is to say, one column is provided with two column readout circuits. A vertical scan circuit 400 selects two rows of pixels in the pixel region at a time, and transmits a driving signal to the pixels in the selected two rows. In this way, pixel signals of the first and second rows can be simultaneously output to the column readout circuits via the vertical output lines 107A and 107B, respectively. One Bayer merging circuit 800 is provided for every two columns. That is to say, one Bayer merging circuit is provided for every four column readout circuits. The Bayer merging circuits receive, as input, A image signals of R, Gr, Gb, and B pixels via the column readout circuits, and generate merged signals thereof.

Figure 11:
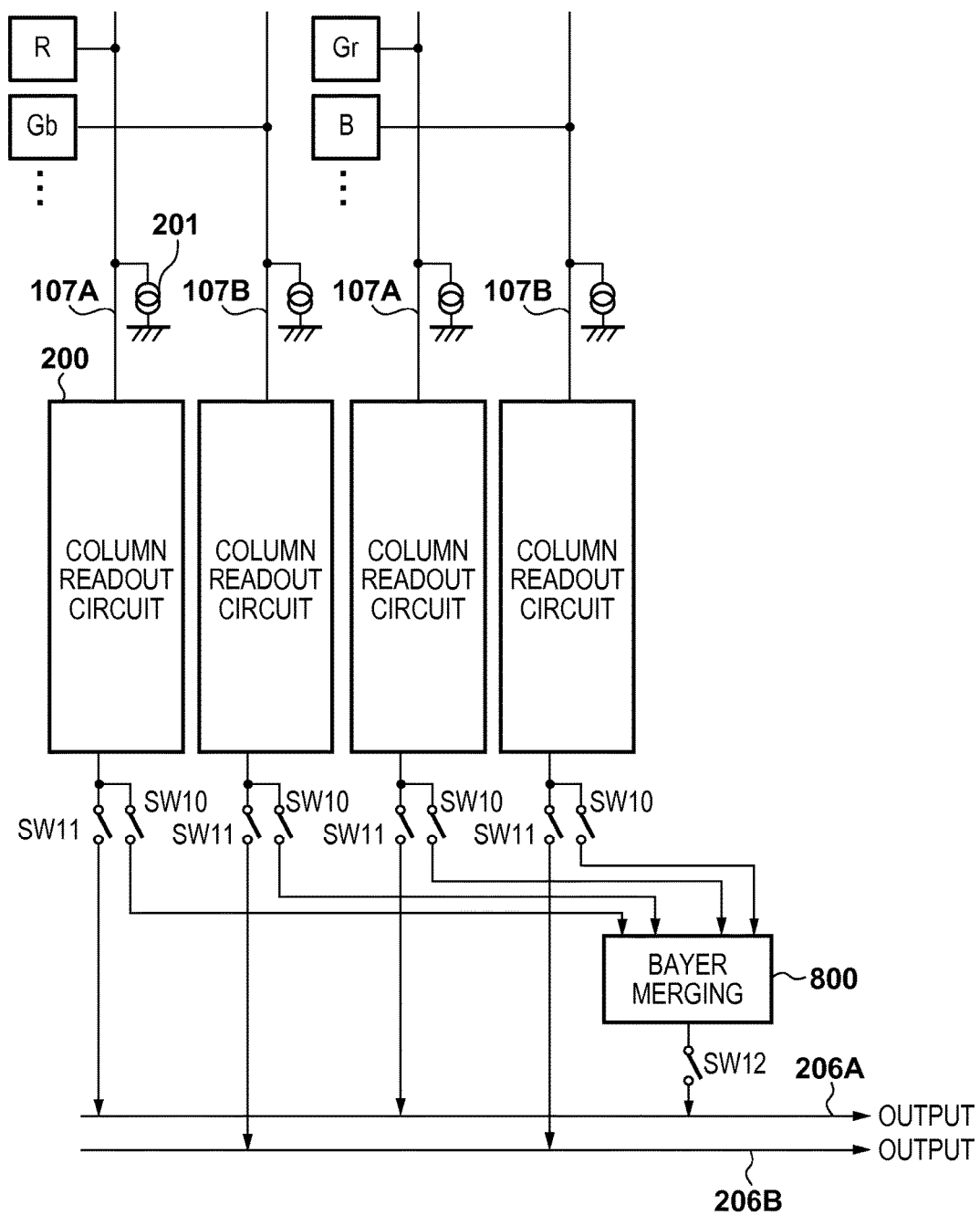
FIG. 11 shows configurations of column readout circuits and a Bayer merging circuit in the image sensor according to the second embodiment.

FIG. 11 shows configurations of (four) column readout circuits and a Bayer merging circuit for two columns that are read out from the pixel region in the same direction. Referring to FIG. 11, a detailed configuration of the column readout circuits 200 is the same as the configuration shown in FIG. 5 of the first embodiment. The column readout circuits connected to the vertical output lines 107A are connected to a digital signal line 206A via switches SW11, whereas the column readout circuits connected to the vertical output lines 107B are connected to a digital signal line 206B via switches SW11. The column readout circuits are also connected to a Bayer merging circuit 800 via switches SW10. The output of the Bayer merging circuit 800 is connected to the digital signal line 206A via a switch SW12.

Figure 12:
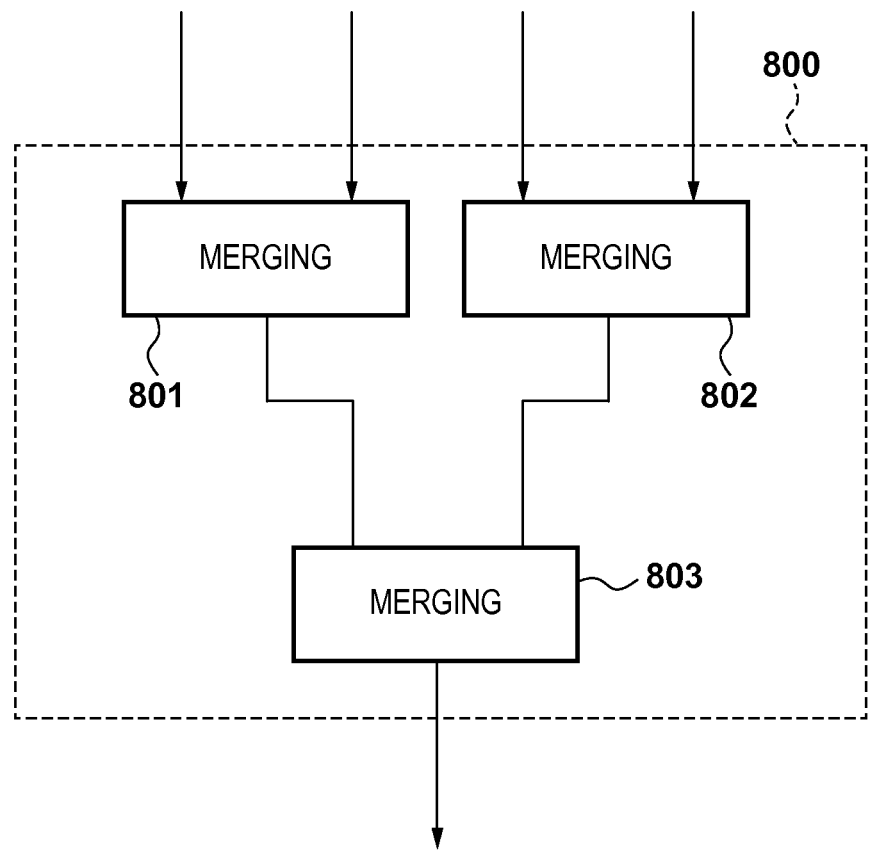
FIG. 12 shows a detailed configuration of a Bayer merging circuit in the image sensor according to the second embodiment.

FIG. 12 shows a detailed configuration of a Bayer merging circuit 800. The Bayer merging circuit 800 is composed of three merging circuits 801, 802, 803. Each of the merging circuits 801, 802 receives, as input, digital signals from two column readout circuits, and stores a merged signal thereof as a digital signal. The merging circuit 803 receives, as input, the merged signals stored in the merging circuits 801, 802, and stores a merged signal thereof as a digital signal. That is to say, the Bayer merging circuit 800 calculates and stores a value obtained by merging all of the digital signals input from four column readout circuits.

Figure 13:
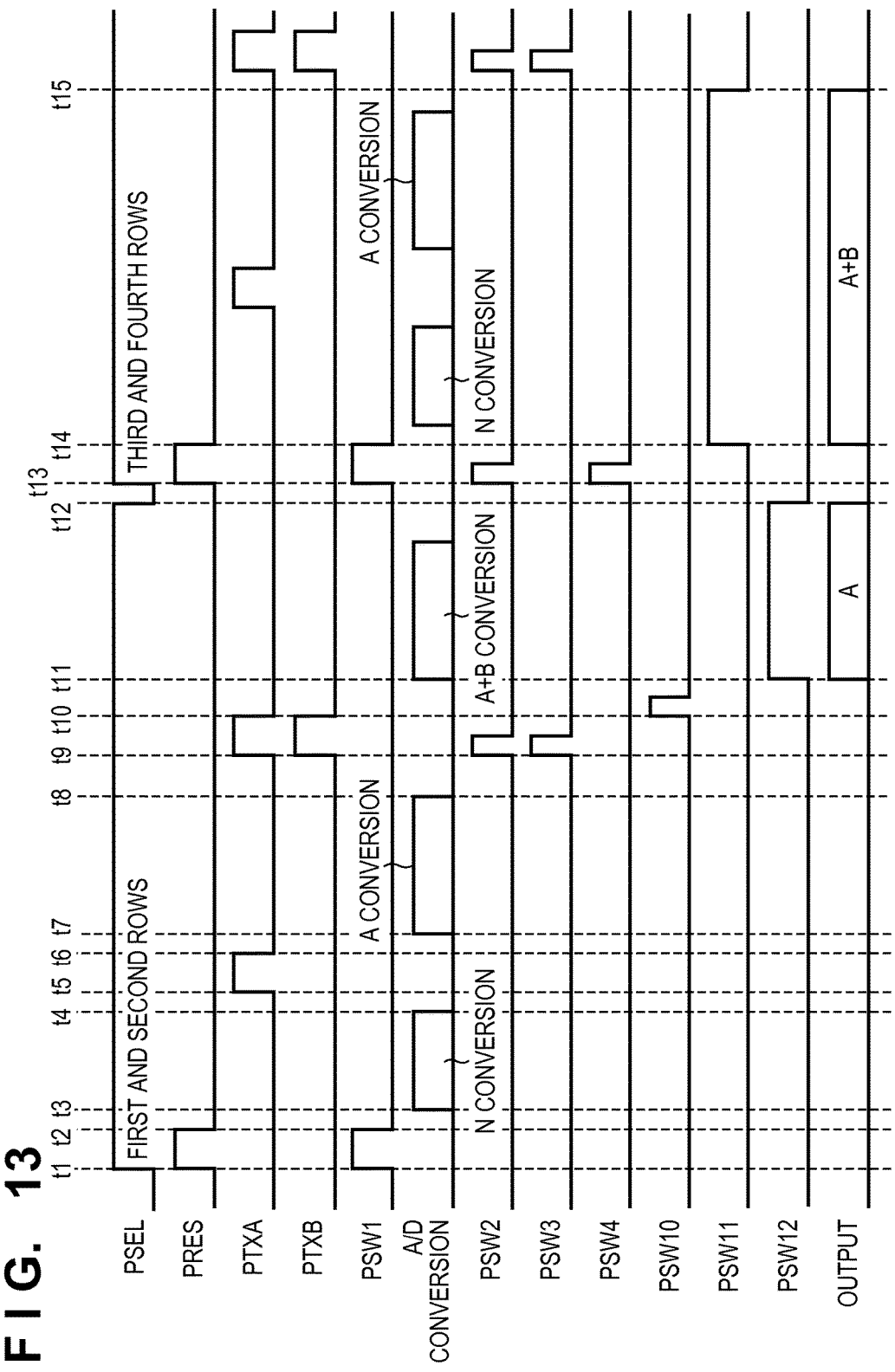
FIG. 13 is a driving timing chart according to the second embodiment.

FIG. 13 is a driving timing chart according to the second embodiment. FIG. 13 corresponds to FIG. 7 of the first embodiment, and a description of portions related to the same operations as the first embodiment is omitted.

At time t1, a vertical selection pulse signal PSEL for the first and second rows is set to H, and selection switches 106 of pixels in the first and second rows are turned on. Consequently, pixels in the first row are connected to the vertical output lines 107A, and pixels in the second row are connected to the vertical output lines 107B. Thereafter, from time t2 to time t8, N signals and A image signals are read out from pixels in the first and second rows, A/D conversion is applied thereto, and the resultant signals are stored into memories M1, M2 of the column readout circuits as digital signals. From time t9 to time t13, A+B image signals are read out from pixels in the first and second rows, A/D conversion is applied thereto, and the resultant signals are stored into memories M3 of the column readout circuits 200 as digital signals.

Furthermore, at time t9, control signals PSW2 and PSW3 are set to H and, similarly to the first embodiment, the N signals stored in the memories M1 and the A image signals stored in the memories M2 are input to S-N circuits 205. After S-N processing is applied to the A image signals, the A image signals are stored in the S-N circuits 205.

Thereafter, at time t10, a control signal PSW10 is set to H, and thus the switches SW10 are turned on. Consequently, the A image signals stored in the S-N circuits of the column readout circuits are input to the Bayer merging circuits 800, and merged signals thereof are generated and stored. Here, as A image signals of R, Gb, Gr, and B pixels are input from the column readout circuits, merged signals thereof represent luminance signals of A images.

Thereafter, between time t11 and time t12, a control signal PSW12 is set to H, the switches SW12 are turned on, and the Bayer merging circuits 800 are connected to the digital output line 206A. Then, the horizontal scan circuits perform column scanning; as a result, the digital A image signals that have been merged into Y signals, which are stored in the Bayer merging circuits, are sequentially output to the outside of the sensor via the digital output line 206A.

At time t13 that follows completion of horizontal scanning for the A image signals, the control signals PSW2 and PSW4 are set to H and, similarly to the first embodiment, the N signals stored in the memories M1 and the A+B image signals stored in the memories M3 are input to the S-N circuits 205. After the S-N processing is applied to the A+B image signals, the A+B image signals are stored in the S-N circuits 205.

Thereafter, between time t14 and time t15, a control signal PSW11 is set to H, the switches SW11 are turned on, and the column readout circuits are connected to the digital signal lines 206A, 206B. Then, the horizontal scan circuits perform column scanning; as a result, the digital A+B image signals stored in the S-N circuits of the column readout circuits are sequentially output to the outside of the sensor via the digital signal lines 206A, 206B. This horizontal scanning is performed in parallel with N conversion and A conversion for the third and fourth rows.

The above-described readout operation is repeated until the last row of the pixel region. Through this readout operation, A+B image signals are output as Bayer signals of R, Gr, Gb, and B pixels from the digital signal lines. On the other hand, A image signals are output after being merged into Y signals through Bayer merging.

Similarly to the first embodiment, a driving method according to the present embodiment can reduce a time period of horizontal scanning for A images by half because the horizontal scanning is performed after Bayer merging of the A image signals. As a result, a time period required to read out signals of the image sensor can be reduced. Furthermore, the number of output pixels of the A image signals can be reduced to one-fourth. On the other hand, as the A+B image signals are read out without Bayer merging, there is no reduction in resolution caused by a reduction in the number of pixels in a captured image. That is to say, a readout time period can be reduced without lowering the image quality of a captured image.

Moreover, the A image signals used for focus detection are merged into luminance signals through Bayer merging; therefore, the accuracy of focus detection can be improved in the case of a scene with a low subject luminance. In addition, by using the luminance signals, stable focus detection can be performed regardless of the color of the subject.

Third Embodiment

In the first and second embodiments, luminance signals are generated by merging A image signals of R, Gr, Gb, and B pixels in the Bayer merging circuits provided in the image sensor 1000; however, a part of the above-described Bayer merging processing may be executed by a signal processing circuit 1001. The present embodiment describes a configuration in which merging circuits provided for column circuits merge R pixel signals with Gr pixel signals, and Gb pixel signals with B pixel signals, and the signal processing circuit 1001 merges R+Gr pixel signals and Gb+B pixel signals into Y signals.

Figure 14:
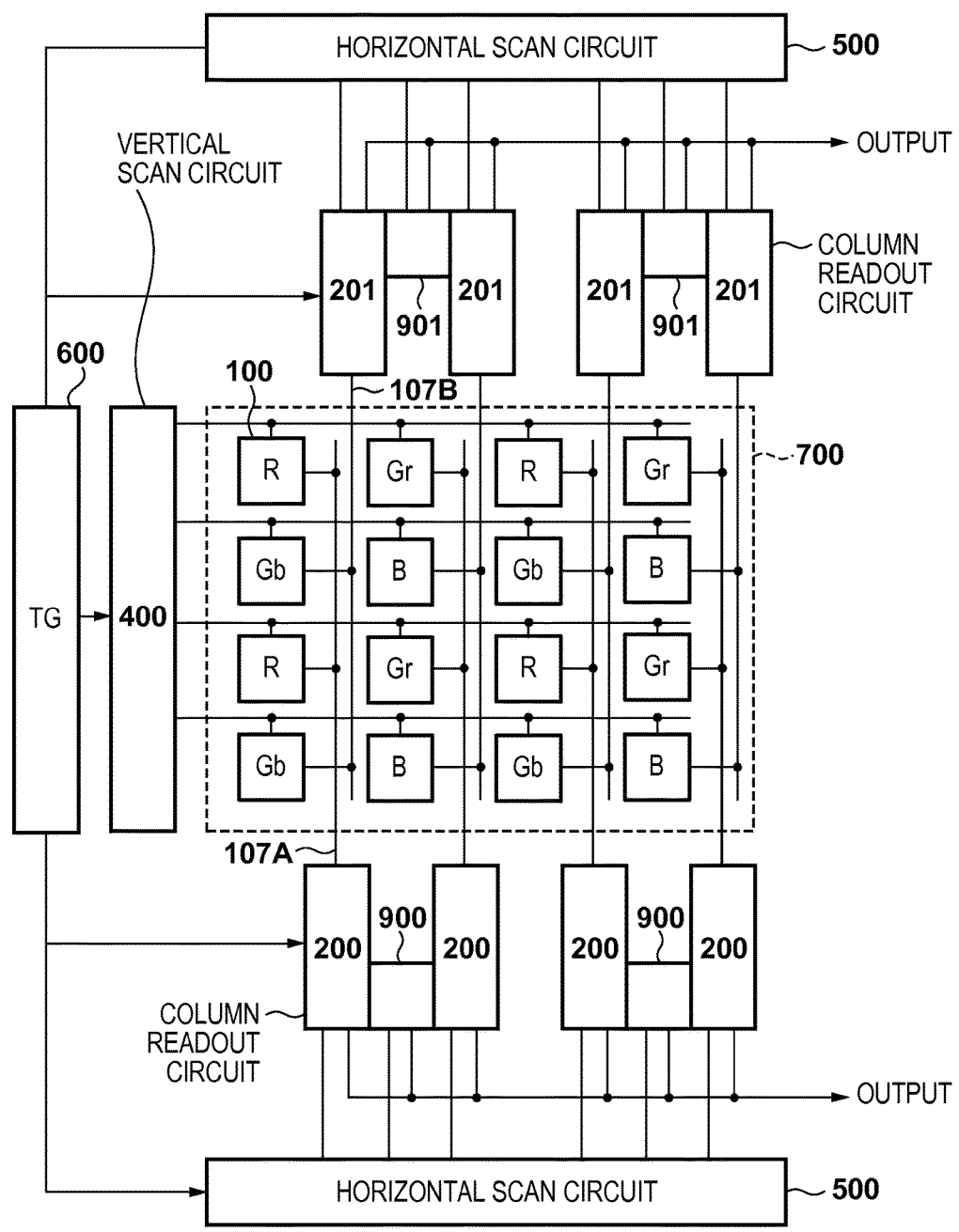
FIG. 14 shows an overall configuration of an image sensor according to a third embodiment.

FIG. 14 shows an overall configuration of an image sensor 1000 according to a third embodiment. FIG. 14 corresponds to FIG. 10 of the second embodiment; constituents that have the same functions as their counterparts in the second embodiment are given the same reference numerals thereas, and a redundant description thereof is omitted. As shown in FIG. 14, every pixel column is provided with two vertical output lines 107A and 107B, pixels in the first row are connected to the vertical output lines 107A, and pixels in the second row are connected to the vertical output lines 107B. The vertical output lines 107A are connected to column readout circuits 200 arranged below a pixel region 700, whereas the vertical output lines 107B are connected to column readout circuits 201 arranged above the pixel region 700. A vertical scan circuit 400 selects two rows of pixels in the pixel region 700 at a time, and transmits a driving signal to the pixels in the selected two rows. In this way, pixel signals of the first and second rows can be simultaneously output to the column readout circuits via the vertical output lines 107A and 107B, respectively.

One merging circuit 900 is provided for every two lower column readout circuits 200. The merging circuits 900 merge A image signals of R pixels and Gr pixels. Similarly, one merging circuit 901 is provided for every two upper column readout circuits 201. The merging circuits 901 merge A image signals of Gb pixels and B pixels.

Figure 15:
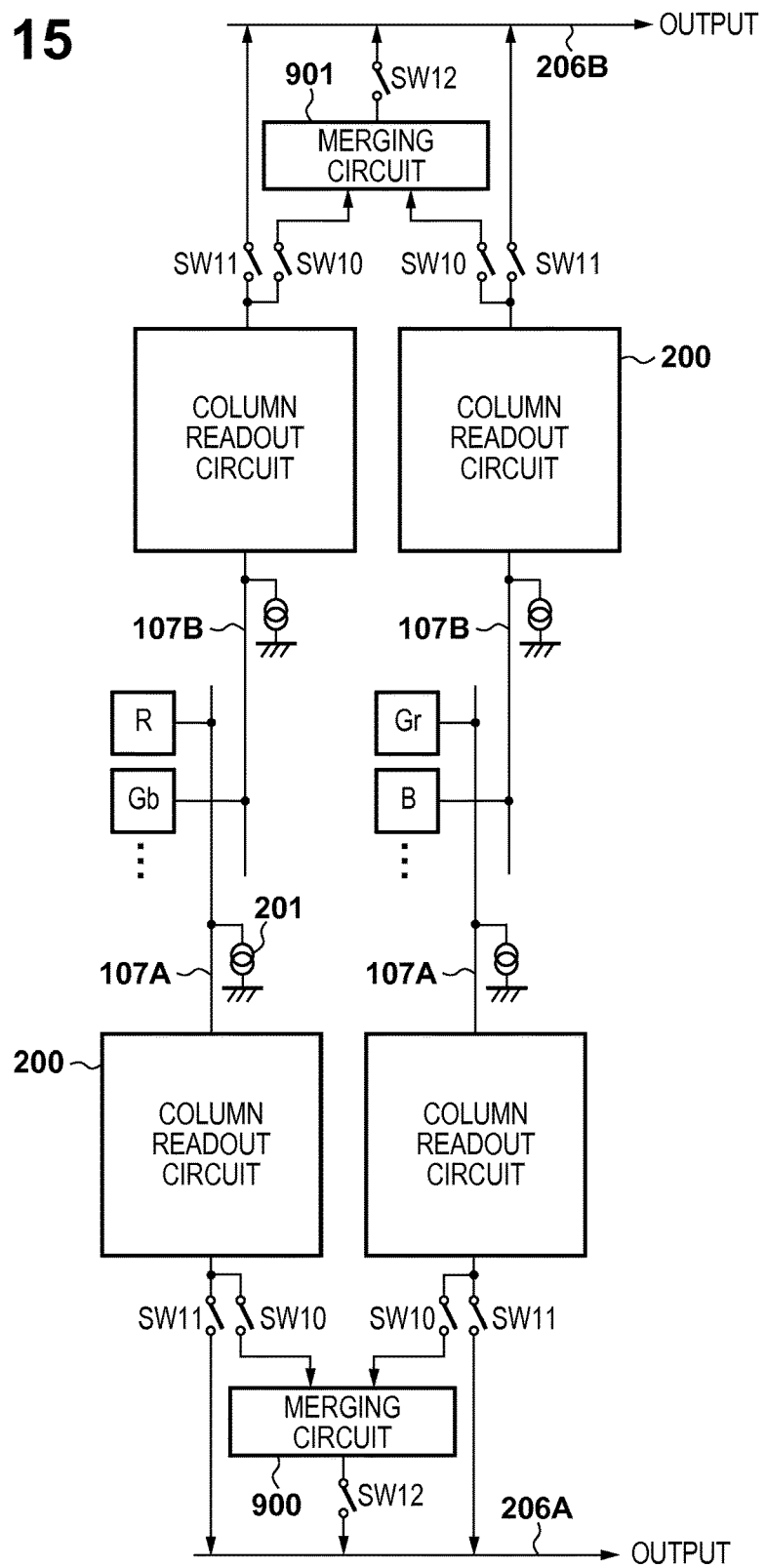
FIG. 15 shows configurations of column readout circuits and merging circuits in the image sensor according to the third embodiment.

FIG. 15 shows configurations of column readout circuits and merging circuits for two pixel columns. The column readout circuits 200 connected to the vertical output lines 107A are connected to a digital signal line 206A via switches SW11, whereas the column readout circuits 201 connected to the vertical output lines 107B are connected to a digital signal line 206B via switches SW11. The column readout circuits are also connected to merging circuits 900, 901 via switches SW10. The outputs of the merging circuits 900 and 901 are connected to the digital signal lines 206A and 206B, respectively, via switches SW12.

A driving timing chart according to the third embodiment is the same as the driving timing chart according to the second embodiment shown in FIG. 13, and thus a detailed description thereof is omitted. The present embodiment differs from the second embodiment in an operation performed when a control signal PSW10 is set to H at time t10 of FIG. 13. At this time, the switches SW10 are turned on, A image signals stored in S-N circuits of the column readout circuits are input to the merging circuits 900, 901, and merged signals thereof are generated and stored. Here, A image signals of R pixels and Gr pixels are input to the merging circuits 900, and A image signals of R+Gr pixels are generated by merging the input signals. On the other hand, A image signals of Gb pixels and B pixels are input to the merging circuits 901, and A image signals of Gb+B pixels are generated by merging the input signals. Thereafter, similarly to the second embodiment, A image signals and A+B image signals are output from the digital signal lines 206A, 206B. Here, A+B image signals are output as Bayer signals of R, Gr, Gb, and B, whereas A image signals are output as signals of R+Gr pixels and Gb+B pixels derived from merging of two colors.

A driving method according to the present embodiment can reduce a time period of horizontal scanning for A images by half because it performs horizontal scanning for A image signals that are obtained by merging two pixels and thus represent signals of R+Gr pixels and Gb+B pixels. As a result, a time period required to read out signals of the image sensor can be reduced. Furthermore, the number of output pixels of the A image signals can be reduced by half. On the other hand, as A+B image signals are read out without merging, there is no reduction in resolution caused by a reduction in the number of pixels in a captured image. That is to say, a readout time period can be reduced without lowering the image quality of a captured image.

Figure 16:
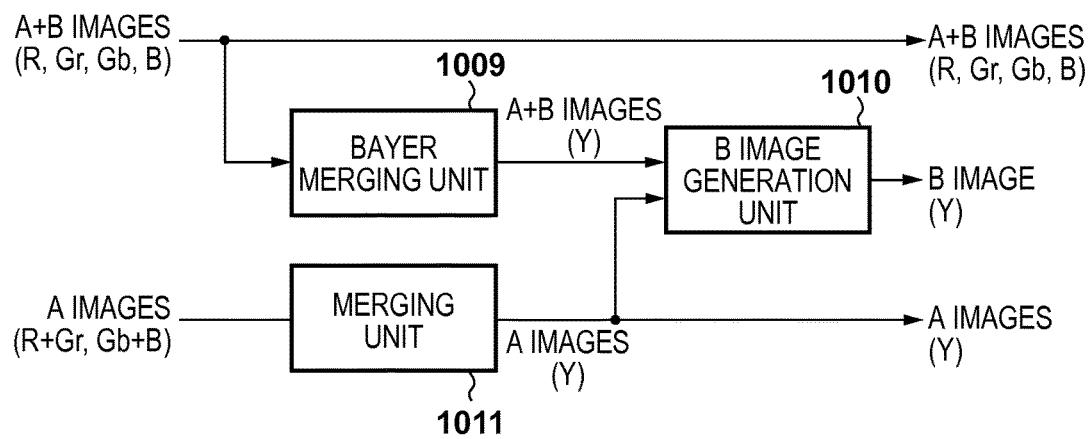
FIG. 16 illustrates B image generation processing according to the third embodiment.

The A image signals and the A+B image signals output from the image sensor 1000 are input to the signal processing circuit 1001 shown in FIG. 2. FIG. 16 illustrates B image generation processing executed by the signal processing circuit 1001. FIG. 16 corresponds to FIG. 9 of the first embodiment; constituents that have the same functions as their counterparts in the first embodiment are given the same reference numerals thereas, and a redundant description thereof is omitted.

The A image signals output from the image sensor as signals of R+Gr pixels and Gb+B pixels are input to a merging unit 1011. Here, the A image signal of R+Gr pixels and the A image signal of Gb+B pixels are merged into a Y signal. This signal is input to a B image generation unit 1010 together with A+B image signals that have been merged into a Y signal by a Bayer merging unit 1009. Then, a B image signal is generated by subtracting the A image signals from the A+B image signals. The signals generated through the foregoing processing, i.e., the A image signals that have been merged into the Y signal and the B image signal, are transmitted to an overall control/computation circuit 1004 and used for focus detection. It should be noted that the B image generation processing shown in FIG. 9 may be executed by a signal processing circuit provided inside the image sensor 1000.

Fourth Embodiment

In the third embodiment, the merging circuits 900, 901 provided for the column circuits generate A image signals of R+Gr pixels and Gb+B pixels, and the merging unit 1011 provided in the signal processing circuit merges the A image signals into luminance signals. In contrast, in the present embodiment, a value obtained by merging A image signals of a Gr pixel and a Gb pixel is used as a luminance signal. This eliminates the necessity of the merging unit 1011 in the signal processing circuit, which is necessary in the third embodiment. Furthermore, the number of merging circuits provided for column circuits is reduced by half compared with the third embodiment.

FIG. 17 shows an overall configuration of an image sensor 1000 according to a fourth embodiment. FIG. 17 corresponds to FIG. 14 of the third embodiment; constituents that have the same functions as their counterparts in the third embodiment are given the same reference numerals thereas, and a redundant description thereof is omitted. As shown in FIG. 17, every pixel column is provided with two vertical output lines 107A and 107B, Gr and Gb pixels are connected to the vertical output lines 107A, and R and B pixels are connected to the vertical output lines 107B. The vertical output lines 107A are connected to column readout circuits arranged below a pixel region 700, whereas the vertical output lines 107B are connected to column readout circuits arranged above the pixel region 700. A vertical scan circuit 400 selects two rows of pixels in the pixel region 700 at a time, and transmits a driving signal to the pixels in the selected two rows. In this way, pixel signals of Gr and Gb pixels and pixel signals of R and B pixels can be simultaneously output to the column readout circuits via the vertical output lines 107A and 107B, respectively. One merging circuit 902 is provided for every two lower column readout circuits. The merging circuits 902 merge A image signals of Gr pixels and Gb pixels.

FIG. 18 shows configurations of column readout circuits and a merging circuit for two pixel columns. The column readout circuits 200 connected to the vertical output lines 107A are connected to a digital signal line 206A via switches SW11, whereas the column readout circuits 200 connected to the vertical output lines 107B are connected to a digital signal line 206B. The lower column readout circuits are also connected to a merging circuit 902 via switches SW10. The output of the merging circuit 902 is connected to the digital signal line 206A via a switch SW12.

A driving timing chart according to the fourth embodiment is the same as the driving timing chart according to the second and third embodiments shown in FIG. 13, and thus a detailed description thereof is omitted. The present embodiment differs from the second and third embodiments in an operation performed when a control signal PSW10 is set to H at time t10 of FIG. 13. At this time, the switches SW10 are turned on, A image signals stored in S-N circuits of the lower column readout circuits are input to the merging circuits 902, and merged signals thereof are generated and stored. Here, A image signals of Gr pixels and Gb pixels are input to the merging circuits 902, and A image signals of Gr+Gb pixels are generated by merging the input signals. Thereafter, similarly to the second and third embodiments, horizontal scanning is performed for the A image signals and A+B image signals. At this time, the A image signals and the A+B image signals are output from the digital signal line 206A, and the A+B image signals are output from the digital signal line 206B. Here, A+B image signals are output as Bayer signals of R, Gr, Gb, and B, whereas A image signals are output as signals obtained by merging Gr pixels and Gb pixels.

Although the merging circuits 902 are arranged only for the column circuits arranged below the pixel region in FIG. 17, the vertical output lines 107A and 107B, to which Gr and Gb pixels and R and B pixels are respectively connected, may be switched every two columns. In this case, merging circuits 902 arranged for upper column circuits and merging circuits 902 arranged for lower column circuits alternate.

A driving method according to the present embodiment can reduce a time period of horizontal scanning for A images, similarly to the first to third embodiments, because horizontal scanning for the A image signals is performed after signals of Gr pixels and Gb pixels are merged. As a result, a time period required to read out signals of the image sensor can be reduced. On the other hand, as the A+B image signals are read out without merging, there is no reduction in resolution caused by a reduction in the number of pixels in a captured image. That is to say, a readout time period can be reduced without lowering the image quality of a captured image.

Although two photodiodes are provided in a unit pixel according to the first to fourth embodiments, the number of photodiodes in a unit pixel is not limited to two. For example, the following configuration may be adopted: four photodiodes are provided in a unit pixel, signals of two photoelectric conversion portions in a unit pixel are read out as signals for focus detection, and signals of all photoelectric conversion portions in a unit pixel are read as signals for image capture.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-207542, filed Oct. 8, 2014, which is hereby incorporated by reference herein in its entirety.

What is claimed is:

1. An image sensor, comprising:
  a pixel region in which a plurality of unit pixels are arranged in a matrix, each unit pixel having a plurality of photoelectric conversion portions;
  a readout circuit that performs a first readout operation and a second readout operation, the first readout operation reading out a first signal from at least one of the plurality of photoelectric conversion portions in each unit pixel, and the second readout operation reading out second signals from all of the plurality of photoelectric conversion portions in each unit pixel;

a generation circuit that generates a luminance signal by combining the first signals of plural different colors at inside of the image sensor; and an output circuit that outputs the luminance signal to outside of the image sensor.

2. The image sensor according to claim 1, wherein the first signals are used for focus detection, whereas the second signals are used for the focus detection and image generation.

3. The image sensor according to claim 2, wherein the focus detection uses a phase difference method.

4. The image sensor according to claim 1, wherein the generation circuit generates, based on the first signals and the second signals, a luminance signal equivalent to signals of photoelectric conversion portions that have not been read out in the first readout operation.

5. The image sensor according to claim 1, wherein the plurality of unit pixels are provided in correspondence with colors of color filters having a predetermined color arrangement.

6. The image sensor according to claim 5, wherein the predetermined color arrangement is a Bayer arrangement composed of first green, second green, blue, and red.

7. The image sensor according to claim 5, wherein the generation circuit generates a luminance signal based on the first signals corresponding to all of the colors in the predetermined color arrangement.

8. An image sensor, comprising:

a pixel region in which a plurality of unit pixels are arranged in a matrix, each unit pixel having a plurality of photoelectric conversion portions;

a readout circuit that performs a first readout operation and a second readout operation, the first readout operation reading out a first signal from at least one of the plurality of photoelectric conversion portions in each unit pixel, and the second readout operation reading out second signals from all of the plurality of photoelectric conversion portions in each unit pixel;

a generation circuit that generates, at inside of the image sensor, based on a combination of the first signals of plural different colors and a combination of the second signals of plural different colors, a third signal equivalent to signals of photoelectric conversion portions that have not been read out in the first readout operation; and an output circuit that outputs the first signals, the second signals, and the third signal to outside of the image sensor.

9. An image capturing apparatus, comprising:

an image sensor including a pixel region in which a plurality of unit pixels are arranged in a matrix, each unit pixel having a plurality of photoelectric conversion portions, a readout circuit that performs a first readout operation and a second readout operation, the first readout operation reading out a first signal from at least one of the plurality of photoelectric conversion portions in each unit pixel, and the second readout operation reading out second signals from all of the plurality of photoelectric conversion portions in each unit pixel, and a generation circuit that generates a first luminance signal by combining the first signals of plural different colors at inside of the image sensor;

a signal processor that generates a second luminance signal based on the second signals corresponding to different colors, and generates, based on the first luminance signal and the second luminance signal, a third luminance signal equivalent to signals of photoelectric conversion portions that have not been read out in the first readout operation; and a focus detection circuit that performs focus detection based on the first luminance signal and the third luminance signal.

10. The image capturing apparatus according to claim 9, further comprising a signal processor that generates image data based on the second signals.

11. An image capturing apparatus, comprising:

an image sensor including:

a pixel region in which a plurality of unit pixels are arranged in a matrix, each unit pixel having a plurality of photoelectric conversion portions, a readout circuit that performs a first readout operation and a second readout operation, the first readout operation reading out a first signal from at least one of the plurality of photoelectric conversion portions in each unit pixel, and the second readout operation reading out second signals from all of the plurality of photoelectric conversion portions in each unit pixel, a generation circuit that generates, at inside of the image sensor, based on a combination of the first signals of plural different colors and a combination of the second signals, a third signal equivalent to signals of photoelectric conversion portions that have not been read out in the first readout operation, and an output circuit that outputs the first signals, the second signals, and the third signal to outside of the images sensor;

a focus detection circuit that performs focus detection based on the first signals and the third signal output from the image sensor; and a signal processor that generates image data based on the second signals output from the image sensor.

* * * * *